United States Patent [19]

Heaton et al.

[11] 3,996,651
[45] Dec. 14, 1976

[54] DEVICE FOR HOLDING A CUTTING INSERT IN THE POCKET OF A TOOL HOLDER

[75] Inventors: James W. Heaton; Kenneth L. Neibauer, both of Greensburg, Pa.

[73] Assignee: Kennametal Inc., Latrobe, Pa.

[22] Filed: Sept. 22, 1975

[21] Appl. No.: 615,555

[52] U.S. Cl. ................................................ 29/96
[51] Int. Cl.² ......................................... B26D 1/12
[58] Field of Search ...................................... 29/96

[56] References Cited

UNITED STATES PATENTS

| 2,598,581 | 5/1952 | McKenna | 29/96 |
| 3,137,918 | 6/1964 | Brevning | 29/96 |
| 3,354,526 | 11/1967 | Erkfritz | 29/96 |
| 3,460,848 | 8/1969 | Brown | 279/4 |

Primary Examiner—Harrison L. Hinson
Attorney, Agent, or Firm—Lawrence R. Burns

[57] ABSTRACT

A tool holder having an insert receiving pocket, the pocket having bottom wall and side wall means with an improved arrangement for providing quick indexing or complete changing of an indexable insert. The improved arrangement comprises a pin element with a conical head on one end for engagement with a cutting insert and cooperating elements of a threaded spring tension connection between the other end of the pin and the tool holder. The insert and pin element are detachably fastened together as one unit, and when the insert is in the pocket with the pin clamped to the holder, the unit is held securely in position for cutting engagement with a workpiece.

4 Claims, 7 Drawing Figures

DEVICE FOR HOLDING A CUTTING INSERT IN THE POCKET OF A TOOL HOLDER

COPENDING APPLICATION:

United States patent application Ser. No. 614,975, filed Sept. 19, 1975, entitled "METHOD AND DEVICE FOR HOLDING A CUTTING INSERT IN THE POCKET OF A TOOL HOLDER", Inventor James F. McCreery.

BACKGROUND OF THE INVENTION

The arrangement of the present invention has been developed primarily for applications involving heavy duty tooling. In cases where metal removal rate must be maintained high, extreme conditions of heat and pressure loading are encountered which must be dealt with efficiently and effectively.

One of the first problems encountered is that of holding the cutting insert securely in the pocket of a tool holder against erratic conditions of load pressure and vibration. At the beginning of a cutting operation, the sudden transition from no load to extreme pressure load on the insert can cause the insert to shift position in the holder and thereby effect the accuracy of the planned cut.

At the end of the cutting operation, the sudden disengagement of the cutting insert from the workpiece causes the pressure load suddenly to be removed from the insert and this sudden change in load can, also, cause the insert to shift and distress any repeatable dimensional accuracy which is essential for most tool holders, especially those used on Numerically Controlled machines, to meet.

During the cutting operation, loads of up to 35,000 pounds may be encountered on the cutting insert which, if the insert is not precisely located and firmly held in the holder to begin with, can also cause shifting of the insert during the cutting operation. It is, therefore, of first importance to provide a tool holder that can precisely and securely seat a cutting insert and then securely hold the cutting insert in location during all phases of the heavy duty cutting operation.

When taking a heavy duty cut, such as described above, the efficiency of removing the metal from a workpiece is, thus, to be maximized. The rate of metal removal rate from a workpiece is, however, only one part of the efficiency factor. When using indexable cutting inserts, there comes a point in time when the cutting edge becomes worn and must be replaced with a fresh cutting edge.

To change a cutting edge, the cutting action must be stopped and the machine operator must index the cutting insert to a new cutting edge or replace the cutting insert altogether if all of the cutting edges thereof have become worn. The time it takes the operator to make this change directly affects the efficiency or metal removal rate of a particular machine.

The operator, having stopped the machine after some very heavy duty cutting, now has the situation that the insert he is about to change or index is extremely hot; in fact, too hot to be handled without gloves, rags, or other protection by the operator. Most gloves and other protection worn by the operator are cumbersome to them and, therefore, any system used for locating and seating a cutting insert in a tool holder, should recognize that a minimum of tools should be used at this point, or that if tools are used, they should be of sufficient size and utility to be used by the operator while using gloves or other protective equipment.

Most of the clamps used in heavy metal cutting today require top clamps above the insert and some type of superstructure on the top face of the insert. It has recently been found that these superstructures may not be desirable in that, as the chip runs across the top face of the insert and strikes the superstructure, a significant back pressure is put on the tool holder and consumes unnecessary horsepower from the machine. Inserts have recently been developed wherein chip control may be had without these power consuming superstructures and, therefore, any positive clamping device which obstructs the top face of the insert is not desirable.

Pin type holders must necessarily be used wherein the upper end of the pin is below the top face of the cutting insert and yet the pin firmly locates and holds the cutting insert in the pocket of the tool holder against the extreme pressure loading of heavy duty cutting.

Most of the pin type holders of the prior art were defective in that the pin type clamps merely held the insert down in the pocket without insuring that the insert was positioned or held back against one side wall of the pocket or the pin type holders mainly held the insert back against a side wall means of the pocket without holding the insert down in the pocket and, therefore, did not prevent fluttering of the insert during extreme conditions.

It is, therefore, an object of the present invention to provide a tool holder having a pin-type clamp that is extremely simple to operate, efficient and fast acting, and while, further, is operable to positively locate the cutting insert down against the bottom wall and back against a side wall of an insert recess pocket while, further, being rigid and strong enough to hold the insert in a fixed location in the holder during the extreme and erratic conditions of load pressure and heat accumulation encountered during a heavy duty cutting operation.

BRIEF SUMMARY OF THE INVENTION

A tool holder is provided with an insert receiving pocket having bottom wall and side wall means. A hole extends downwardly from the bottom wall of the pocket in the tool holder. A central hole is provided in an indexable cutting insert and a pin element is extended through the central hole. One end of the pin element has a conically shaped head to engage the insert from above with means on the body of the pin to detachably hold the insert and preferably a shim member near the upper end of the pin.

Cooperating elements of a threaded spring tension connection are provided on the other end of the pin element and the tool holder to hold the pin, with certain forces exerted thereon, in the tool holder.

The threaded spring tension connection comprises a floating threaded nut held captive in the tool holder and located near the bottom of the hole which extends downwardly from the bottom wall of the pocket in the tool holder. Upwardly along the hole in the tool holder a counterbore is provided and seated in the counterbore are spring washers. The spring washers are held slightly compressed in the counterbore by the captive threaded nut on the tool holder. The lower end of the pin element is threaded so as to engage the threaded nut means and compress the spring washers. The spring washers, when so compressed, provide a constant and predetermined downward force on the pin thereby holding the insert against the bottom and side wall means of the insert receiving pocket.

The side wall means of the pocket is spaced closer to the central axis of the hole in the tool holder than is the axis of the central hole of the insert when the insert is seated in the pocket and abutted against the bottom and side wall means of the pocket.

The length of the pin from the head to the other end of the pin that engages the captive threaded nut on the tool holder is such that the head of the pin is biased downward with a constant predetermined force. The conically shaped head of the pin distributes this biased downward force so that the insert is held back against the side wall means while also being held down against the bottom wall of the pocket.

The outer extremities of the side wall means, at least at the upper edges, are relieved, or notched, to provide a space for receiving insert cutting edges, which may have mushroomed over during cutting, so that any corners that have been mushroomed will not interfere with location of the insert in the tool holder when the insert is indexed to a new position in the holder.

The exact nature of the present invention will become more clearly apparent upon reference to the following detailed description taken in connection with the accompanying drawings in which.

DETAILED DESCRIPTION OF THE INVENTION

Figure 1:
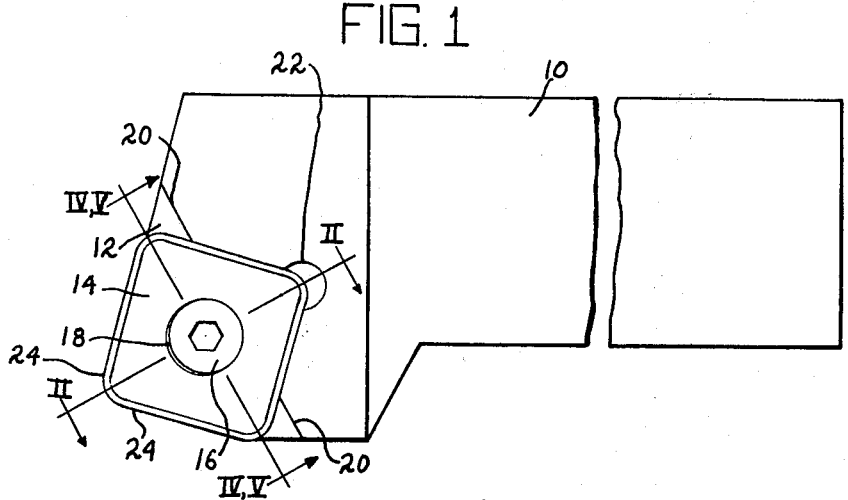
FIG. 1 is a plan view of a tool holder according to the present invention with a cutting insert mounted thereon.

In FIG. 1 is shown a tool holder 10 which has, at its forward end, an insert receiving pocket 12. Seated in the insert receiving pocket 12 is an indexable cutting insert 14. As can be seen in FIG. 1, the top of a pin element 16 is engaged with a central hole 18 in cutting element 14. More details of this engagement will be shown in FIG. 2.

The top view of FIG. 1 also shows relief notches 20 and 22 which are provided on the holder at the sides of the insert receiving pocket to provide clearance for any cutting edges 24 of cutting insert 14 which may be mushroomed over after having been used.

Figure 2:
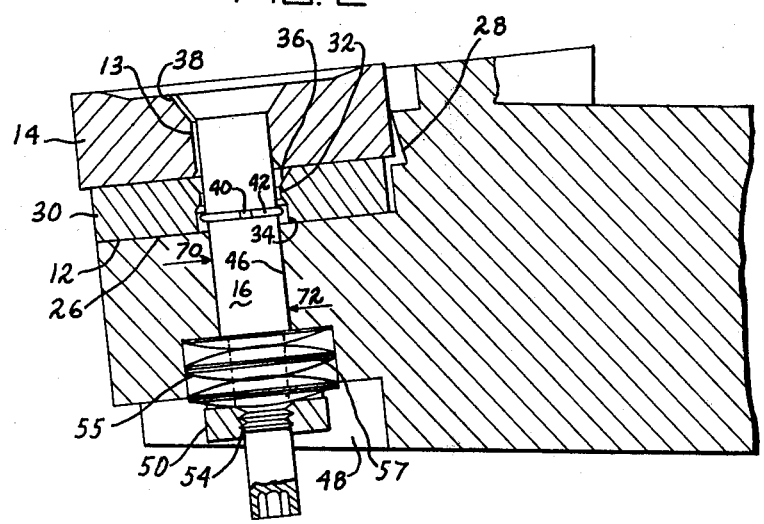
FIG. 2 is a vertical longitudinal section indicated by line II—II on FIG. 1 and showing more in detail the cutting insert mounting arrangement.

Referring now to FIG. 2, which is a sectional view of the insert locating and locking arrangement, the insert receiving pocket 12 will be seen to have a bottom wall 26 and side wall means 28. In this particular case, a shim element 30 and a cutting insert 14 are shown in pocket 12. Shim element 30 has a central hole 32 provided therein, a bottom portion of which has an enlarged counterbore portion 34 with a tapered upper end and the top portion of center bore 32 has an upwardly facing tapered or conical portion 36.

The cutting insert 14 has a central through hole 13 therein, and near the top portion of the center hole 13, there is an upwardly facing tapered or conical recess 38. The pin element 16 and the cutting insert 14 and the shim element 30 are all held in detachable relationship with one another by a groove 40 and wire locking element 42 which are located on pin element 16.

The groove 40 on pin element 16 extends around the periphery of the pin element and wire element 42 is sized so as to be seated in groove 40 and yet protrude radially outward from pin 16 so as to be freely received in the counterbore portion 34 of the shim while being engageable with the shoulder at the bottom of the counterbore portion. Wire element 42 can, however, readily be forced through the center holes in the shim and the insert.

When assembling the shim 30, the cutting insert 14 and the pin element 16, the pin element is extended down through the central hole of cutting insert 14 with the wire locking element 42 being pressed through the center hole in cutting insert 14 until enlarged head portion 44 on pin element 16 engages the upwardly facing, radially opening recess 38 on cutting insert 14.

Next, the shim element 30 is brought up the shank of pin element 16 and the radially opening recess 36 compresses wire element 42 into groove 40 until the wire element 42 can pass through the center hole 32 of shim element 30. After the wire element 42 has passed through center hole 32 and reached the enlarged counterbore portion 34, the wire element expands and thereby holds shim element 30 and cutting insert 14 on the pin element 16 near the upper end thereof.

Shim element 30 is provided with a downwardly facing conical shoulder portion between enlarged counterbore 34 and center hole 32 so that a predetermined amount of downward force on shim element 30 will operate to detach shim element 30 and cutting insert 14 from pin 16.

With the above combined elements of cutting insert 14, shim element 30 and pin 16 having been this far described, the tool holder 10 has been provided, as has been mentioned, with the bottom wall 26 and side wall means 28, for receiving the combined elements. Further, the tool holder 10 has been provided with a through hole 46 extending downwardly from bottom wall 26 in the tool holder 10.

The lower end of pin element 16, indicated at 54, is adapted threadedly to engage a captive threaded nut 50 when pin element 16 is extended downwardly through hole 46. Nut 50 is dovetail shaped in cross section and is loosely fitted in a dovetail groove 51 formed in holder 10.

Enlarged counterbore 55 is provided in the tool holder 10 at the lower end of hole 46 and seated therein are spring washers 57 which are convex in one direction and are placed in face to face relationship with one another so as to take advantage of their compressive spring-like qualities. Threaded nut 50 is captively held on the bottom of tool holder 10 and compressively contains spring washers 57 in counterbore 55.

Threaded nut 50, although captively held, does have some freedom of movement in the axial direction of hole 46 so that threadedly advancing pin element 46 into engagement with threaded nut 50 will increase the tension preload on pin 46. When pin 46 is threadedly disengaged from nut 50, the spring washers exert a tensional force downward on nut 50 holding it against its captive dovetail groove 51 in tool holder 10 and thereby keeping the nut 50 and washers 57 from falling out of tool holder 10.

The upper side of nut 50 has an upstanding concave boss 59 which is receivable in counterbore 55. The upper end of boss 59 is concave to provide a seat for the lowermost one of spring washers 57.

The nut 50 extends laterally from boss 59 and, when the pin element 16 is tightened in the nut 50, the nut abuts the bottom of the dovetail groove 51.

Figure 4:
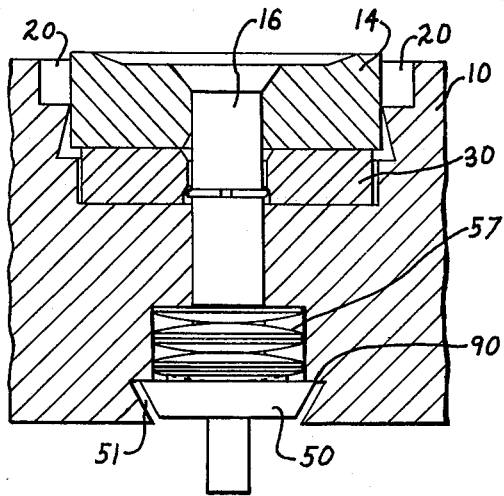
FIG. 4 is a sectional view indicated by line IV—IV on FIG. 1 showing the threaded spring tensioning connection when the pin element is fully engaged with the threaded nut.
Figure 5:
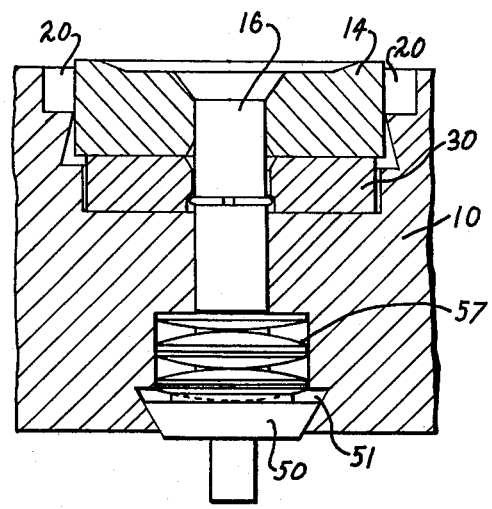
FIG. 5 is a sectional view indicated by line V—V on FIG. 1 showing the threaded spring tensioning connection when the pin element is loosened in the threaded nut.

The pin element and nut in loosened condition are shown in FIG. 5 with the nut supported on the inclined side walls of groove 51, while FIG. 4 shows these elements in tightened up condition with nut 50 abutting the downwardly facing bottom wall of groove 51.

As can be seen in FIG. 2, the distance from the contact area of side wall means 28 to the central axis of hole 46 in tool holder 10 is designed so as to be slightly less than the distance from a side wall of the cutting insert 14 to the axis of the central through hole 18 of the insert. This slight offset and the correct sizing of the diameter holes 13 and 46 and the shank diameter of pin 16 will cause a rearward clamping action of cutting insert 14 against wall means 28 of the tool holder pocket when the pin element 16 is tightened in nut 50.

The shank of pin element 16 will bear against the portions of through hole 46 indicated by arrows 70 and 72 when the threaded spring tensioning elements 50, 54 and 57 are engaged, forcing the upper part of pin 16 toward side wall means 28 of the pocket to hold cutting insert 14 back against side wall means 28.

In FIG. 2 is shown a configuration of side wall means 28 on tool holder 10 with the side wall means extending downwardly from the top of tool holder 10 and is slanted away from the side wall of insert 14. Beneath insert 14, shim element 30 is seated against the bottom wall means 26, but the side wall 60 of side wall means 28 does not abut any side walls of shim element 30.

Side wall means 28 is designed to contact an upper portion of a side wall of cutting insert 14 and provide a solid line contact with cutting insert 14 to assure positive location of cutting insert 14 as each side is indexed into abutment with side wall means 28. Further, the angling of side wall means 28 provides that, when the insert is engaged with a metal workpiece, the lateral force being exerted on cutting insert 14 holds it firmly back against the side wall means 28.

The head of the pin, as mentioned, holds the insert and shim downwardly on the bottom wall of the pocket. The angling of side wall means 28 further allows tool holder 10 to accommodate a double sided cutting insert should that be desirable in that any used mushroomed cutting edges that are turned down will have clearance and, therefore, not engage the side wall of the insert receiving pocket in tool holder 10.

As has been mentioned above, the cutting insert 14, shim element 30 and pin element 16 are assembled together as a unit which is removable from the insert receiving pocket 12 of tool holder 10. When the pin element 16 is disengaged from the floating nut 50, the cutting insert assembly may be removed from the tool holder as a unit. The pocket 12 can then be cleaned of rust, scale, steel slivers and other material which might accumulate in the pocket when involved with extremely heavy duty cutting operations.

The cutting insert assembly, once the pin 16 is disengaged from the threaded nut 50, can either be indexed by spinning the cutting insert 14 to a new corner or may be removed and replaced by a completely new assembly. This would leave the operator free to inspect a used cutting insert 14 and shim element 30 while the machine is running and thereby minimize down time on the machine.

Preferably, the pin element 16 engages the threaded nut 50 with a minimum of threads; approximately 2½ revolutions of pin element 16 are all that should be necessary to either fully engage threaded nut 50 or fully disengage threaded nut 50. The spring washers 57 preferably consist of approximately four, or five, belville washers located in the enlarged counterbore 55.

Advantageously from this compressive arrangement, when the threaded nut is threadedly advanced on pin 16, the nut bottoms against the tool holder in a noticeable manner and, therefore, there is no danger of the operator overtorqueing pin element 16 in threaded nut 50.

The spring washers 57 now provide a predetermined downward preload on the insert and the downward preload, in turn, produces a horizontal force on the insert to also hold it back against side wall means 28 of pocket 12. These downward and sideward forces prevent insert flutter during entry into the cutting operation and also prevent fretting type movement of one insert during interrupted and runout type cutting and ensures that the insert is well seated and stays in position throughout all erratic cutting force conditions encountered.

When involved with heavy duty cutting operations, high temperatures are encountered on the insert, and because there is a severe difference in the coefficient of thermal expansion between the carbide cutting insert and the steel pin element 16, expansion can occur which normally would tend to loosen a clamping arrangement. In the clamping arrangement of the present invention, the downward tensioning effect of spring washers 57 will automatically compensate for any expansion or elongation of pin element 16 and insure a nearly constant load upon pin element 16 and cutting insert 14 even though metal expansion may occur anywhere in the clamping assembly.

Figure 3:
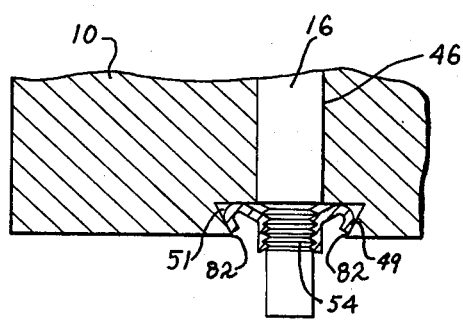
FIG. 3 is an alternate construction of a threaded spring tensioning arrangement.

Referring now to FIG. 3, a modified threaded pretensioning arrangement is shown therein. Tool holder 10 is shown in a cut-away view at the lower end of hole 46 through which pin element 16 has been inserted. A dovetail groove 51 is provided on the bottom of tool holder 10 and captively held in the dovetail groove is a spring clip 49 having internal threads 86 to engage threads 54 on pin element 16. The sloping side walls 82 of dovetail groove 51 hold the spring clip 49 in place.

Referring now to FIG. 4, tool holder 10 is shown in cross section indicated by line IV—IV on FIG. 1. The assembly of the pin element 16, cutting insert 14 and shim element 30 is shown in a firmly clamped position. Threaded nut 50 has been threadedly advanced on pin 16 such that spring washers 57 are compressed together and threaded nut 50 is bottomed against the downwardly facing wall 90 of the dovetail groove 51. Preferably, a minimum of threads are engaged between pin element 16 and threaded nut 50, the minimum amount of threads being 2½ to 3 full threads.

FIG. 5 is a sectional view similar to FIG. 4. However, the pin element 16 is now shown loosened in, or disengaged from threaded nut 50 and the threaded nut 50 is now held downwardly in dovetail groove 51 by the expansion of the spring washers 57. Shown in this position, the assembly of pin element 16, cutting insert 14 and shim element 30, when the pin element is fully disengaged from nut 50, is freely removable from the holder by lifting the assembly straight up.

Figure 6:
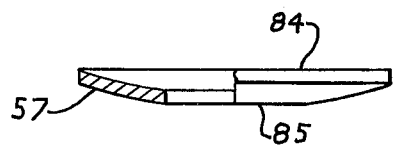
FIG. 6 shows one form which the spring tensioning means of the present invention can take.

FIG. 6 shows a spring washer 57 used in the present invention and which washer has a concave configuration in one direction. Preferably, this would be a belville washer having an upward side 84. Spring washers 57 are placed in face to face relationship. Sides 84 on two washers will be abutting each other and these pairs will then be stacked one on top of the other with sides 85 of the pairs abutting each other.

Figure 7:
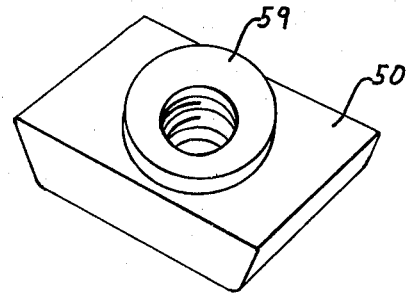
FIG. 7 shows the floating captive threaded nut according to the present invention.

Referring now to FIG. 7, as shown therein, threaded nut 50 is adapted to slide into dovetail groove 51 and is shown with an upstanding boss 59 as shown thereon which preferably engages side 85 of the lowermost spring washer in the enlarged counterbore.

The pin element 16, it will be evident, is received in hole 46 in the tool holder with a small clearance, say, about 0.007 inches on the diameter. Due to this clearance, pin element 16 can tilt in hole 46 an amount up to about one-half degree in exerting the rearwardly directed force on the insert which presses the insert against the side wall means of the pocket in the holder.

Modifications may be made within the scope of the appended claims.

We claim:

1. In a tool holder for supporting an insert with a central hole therein, said tool holder having a pocket comprised of a bottom wall and side wall for seating the insert therein, a hole formed downwardly through said bottom wall and having the axis offset towards said side wall from the axis of said central hole of the insert, when said insert is seated in said pocket, a pin member having a head on one end adapted to engage the insert from above and the other end threaded and adapted for extending downwardly through the central hole in the insert and said hole formed downwardly in said bottom wall in said tool holder, and a nut threadedly engaged with said other end of said pin member and adapted to abut a lower side of said tool holder to clamp the insert in said seated position, the improvement which comprises a counterbore formed in at least one of the opposing faces of said nut and said holder, said counterbore formed coaxial with said hole in said bottom wall, spring means seated in the counterbore and in unstressed condition projecting axially outwardly from the mouth of the counterbore, said nut compressing said spring means and abutting the bottom of the holder when the pin member is tightened in the nut.

2. The improvement according to claim 1 in which said holder is formed with a slot in the bottom extending angularly to the axis of said counterbore and intersecting the axis of the counterbore, said nut being captive in said slot.

3. The improvement according to claim 1 in which said holder is formed with a dovetail slot in the bottom extending angularly to the axis of said counterbore and intersecting the axis of the counterbore, said nut being dovetail shape in cross section and being captive in said slot, said nut having freedom of movement in said slot in a direction parallel to the axis of said counterbore which is less than the amount of protrusion of said spring means from the mouth of the counterbore when the spring means is unstressed.

4. The improvement according to claim 3 in which said nut is formed with a curved recess on the upper side, said spring means comprising a stack of spring washers, the lowermost of said spring washers seating in the recess on the upper side of the nut.

* * * * *